US012634234B2

(12) United States Patent
Tseng et al.

(10) Patent No.: US 12,634,234 B2
(45) Date of Patent: May 19, 2026

(54) CONTAINER NETWORK COMMUNICATION SYSTEM AND METHOD

(71) Applicant: National Yang Ming Chiao Tung University, Hsinchu City (TW)

(72) Inventors: Chien Chao Tseng, Hsinchu City (TW); Chieh Chih Chang, Tainan City (TW)

(73) Assignee: National Yang Ming Chiao Tung University, Hsinchu City (TW)

( * ) Notice: Subject to any disclaimer, the term of this patent is extended or adjusted under 35 U.S.C. 154(b) by 300 days.

(21) Appl. No.: 18/218,919

(22) Filed: Jul. 6, 2023

(65) Prior Publication Data

US 2024/0333647 A1     Oct. 3, 2024

(30) Foreign Application Priority Data

Mar. 27, 2023    (TW) ................................. 112111540

(51) Int. Cl.
*H04L 45/76* (2022.01)
*H04L 12/46* (2006.01)

(52) U.S. Cl.
CPC .......... *H04L 45/76* (2022.05); *H04L 12/4633* (2013.01)

(58) Field of Classification Search
CPC ... G06F 2009/4557; G06F 2009/45587; G06F 2009/45595; G06F 9/455; G06F 9/45558; G06F 9/5072; G06F 9/5077; H04L 12/4633; H04L 12/4641; H04L 2101/622; H04L 41/0895; H04L 45/02; H04L 45/38;

H04L 45/586; H04L 45/64; H04L 45/66; H04L 45/74; H04L 45/745; H04L 45/76; H04L 49/70; H04L 61/103; H04L 67/10
See application file for complete search history.

(56) References Cited

U.S. PATENT DOCUMENTS

| | | | |
|---|---|---|---|
| 8,493,851 B2 | 7/2013 | Fan | |
| 11,089,511 B2 | 8/2021 | Yu | |
| 11,444,836 B1* | 9/2022 | Mariappan | .............. H04L 67/10 |

(Continued)

FOREIGN PATENT DOCUMENTS

| | | |
|---|---|---|
| EP | 2385660 A1 | 11/2011 |
| EP | 2922345 A1 | 9/2015 |

(Continued)

OTHER PUBLICATIONS

An-Dee Lin et al., "Toward Performance Optimization with CPU Offloading for Virtualized Multi-Tenant Data Center Networks," IEEE Network, vol. 30, Issue 3, 2016 (ref.01).

(Continued)

*Primary Examiner* — Christopher Biagini
(74) *Attorney, Agent, or Firm* — CKC & Partners Co., LLC

(57) ABSTRACT

The present disclosure provides a container network communication method, which includes steps as follows. An encapsulation based on a tunneling protocol is performed on a first packet with a destination network address indicating a second pod by a first tunnel endpoint of a first SDN switch, so as to obtain a first tunnel packet; the first tunnel packet is sent from the first SDN switch to the second SDN switch, and then performing a decapsulation based on the tunneling protocol on the first tunnel packet by a second tunnel endpoint of the second SDN switch, so that the second pod obtains a data of the first packet.

17 Claims, 2 Drawing Sheets

(56) References Cited

U.S. PATENT DOCUMENTS

| | | |
|---|---|---|
| 2011/0274108 A1 | 11/2011 | Fan |
| 2014/0004865 A1 | 1/2014 | Bhargava et al. |
| 2014/0341187 A1 | 11/2014 | Lei et al. |
| 2015/0045032 A1 | 2/2015 | Tomici et al. |
| 2015/0169340 A1* | 6/2015 | Haddad ............... G06F 9/45533 |
| | | 718/1 |
| 2015/0281067 A1* | 10/2015 | Wu ........................ H04L 41/122 |
| | | 370/392 |
| 2016/0065386 A1* | 3/2016 | Hari .................... H04L 12/4645 |
| | | 370/254 |
| 2017/0099617 A1 | 4/2017 | Tomici et al. |
| 2017/0150401 A1 | 5/2017 | Guo et al. |
| 2018/0048593 A1* | 2/2018 | Tian ........................ H04L 45/38 |
| 2018/0069754 A1 | 3/2018 | Dasu et al. |
| 2019/0158537 A1* | 5/2019 | Miriyala ............... G06F 21/606 |
| 2019/0230039 A1 | 7/2019 | Wang et al. |
| 2019/0364456 A1 | 11/2019 | Yu |
| 2020/0059370 A1* | 2/2020 | Abraham .............. H04L 45/645 |
| 2020/0204492 A1* | 6/2020 | Sarva ..................... H04L 67/34 |
| 2020/0267623 A1* | 8/2020 | Altay ...................... H04L 45/64 |
| 2020/0310784 A1* | 10/2020 | Krishnan .............. H04L 45/026 |
| 2020/0314006 A1* | 10/2020 | Mackie ............... H04L 12/4633 |
| 2020/0344147 A1* | 10/2020 | Pianigiani ........... H04L 41/0806 |

FOREIGN PATENT DOCUMENTS

| | | |
|---|---|---|
| EP | 2829110 B1 | 10/2016 |
| EP | 3160183 A1 | 4/2017 |
| EP | 2922345 B1 | 2/2020 |
| TW | 201322686 A | 6/2013 |
| WO | 2013091236 A1 | 6/2013 |
| WO | 2013142361 A1 | 9/2013 |
| WO | 2016090900 A1 | 6/2016 |
| WO | 2018165934 A1 | 9/2018 |
| WO | 2020019958 A1 | 1/2020 |

OTHER PUBLICATIONS

Ryo Nakamura et al., "Protocol Independent NIC Offloading for Overlay Networks," ACM SIGCOMM CoNEXT 2015 Student Workshop, 2015 (ref.02).
Shixiong Qi et al., "Assessing Container Network Interface Plugins: Functionality, Performance, and Scalability," IEEE Transactions on Network and Service Management, vol. 18, No. 1, Mar. 2021 (ref.03).
Tianlong Yu et al., "FreeFlow: High Performance Container Networking," Proceedings of the 15th ACM Workshop on Hot Topics in Networks (HotNets '16), 2016 (ref.04).

* cited by examiner

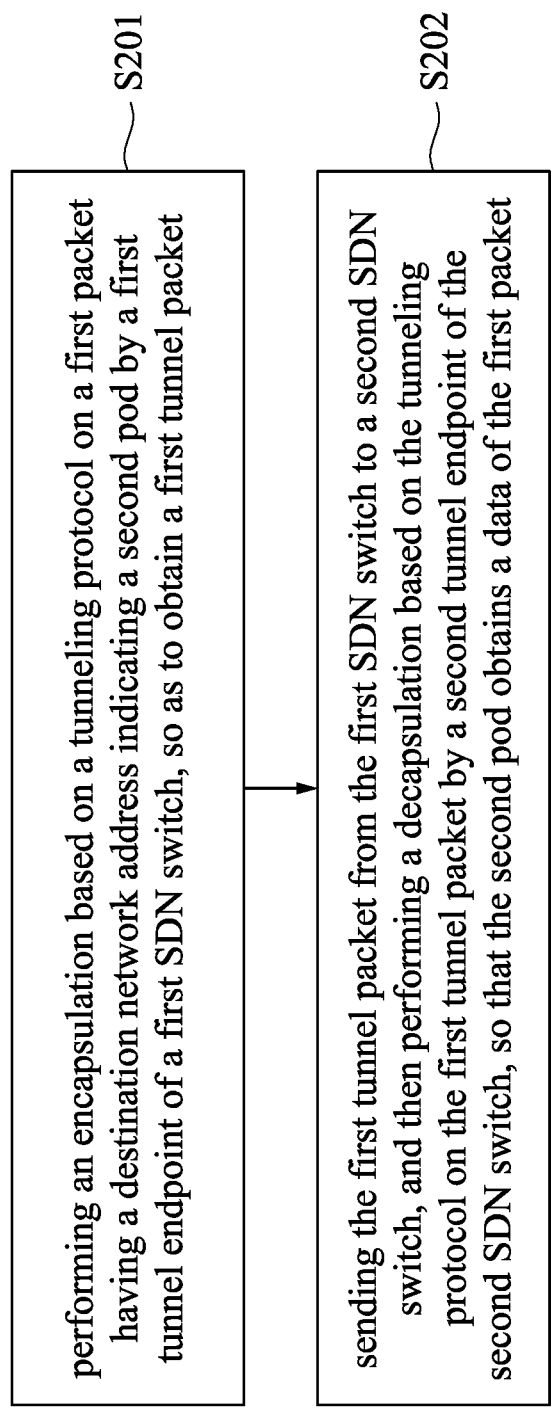

200 performing an encapsulation based on a tunneling protocol on a first packet having a destination network address indicating a second pod by a first tunnel endpoint of a first SDN switch, so as to obtain a first tunnel packet

S201 sending the first tunnel packet from the first SDN switch to a second SDN switch, and then performing a decapsulation based on the tunneling protocol on the first tunnel packet by a second tunnel endpoint of the second SDN switch, so that the second pod obtains a data of the first packet

CONTAINER NETWORK COMMUNICATION SYSTEM AND METHOD

CROSS-REFERENCE TO RELATED APPLICATION

This application claims priority to Taiwan Application Serial Number 112111540, filed Mar. 27, 2023, which is herein incorporated by reference.

BACKGROUND

Field of Invention

The present invention relates to network communication systems and methods, and more particularly, container network communication systems and methods.

Description of Related Art

In the Kubernetes network environment, multi-container network communication needs to rely on the container network interface plugins. There are many container network interface plugins on the market that can meet the needs of complex container network communication scenarios.

However, the container network interface plugins on the market generally use the computing resources of the nodes to implement the encapsulation and decapsulation based on the tunneling protocol, so as to achieve the container network communication of the cross-network nodes. During the frequent communications among many containers, a large loss of the computing resources occurs. Thus, the quality of information services is decreased, and the communication performance of the container network is poor.

SUMMARY

The following presents a simplified summary of the disclosure in order to provide a basic understanding to the reader. This summary is not an extensive overview of the disclosure and it does not identify key/critical components of the present invention or delineate the scope of the present invention. Its sole purpose is to present some concepts disclosed herein in a simplified form as a prelude to the more detailed description that is presented later.

According to embodiments of the present disclosure, the present disclosure provides container network communication systems and methods, to solve or circumvent aforesaid problems and disadvantages in the related art.

An embodiment of the present disclosure is related to a container network communication method, comprising steps of: performing an encapsulation based on a tunneling protocol on a first packet with a destination network address indicating a second pod by a first tunnel endpoint of a first SDN switch, so as to obtain a first tunnel packet; sending the first tunnel packet from the first SDN switch to the second SDN switch, and then performing a decapsulation based on the tunneling protocol on the first tunnel packet by a second tunnel endpoint of the second SDN switch, so that the second pod obtains a data of the first packet.

In one embodiment of the present disclosure, the container network communication method further includes: performing the encapsulation based on the tunneling protocol on a second packet with a destination network address indicating a first pod by a second tunnel endpoint of a second SDN switch, so as to obtain a second tunnel packet; sending the second tunnel packet from the second SDN switch to the first SDN switch, and then performing the decapsulation based on the tunneling protocol on the second tunnel packet by a first tunnel endpoint of the first SDN switch, so that the first pod obtains a data of the second packet.

In one embodiment of the present disclosure, the container network communication method further includes: executing the first pod through a first node, and the first node connected to the first SDN switch; executing the second pod through a second node, the second node connected to the second SDN switch, and the second SDN switch connected to the first SDN switch through an Internet; executing a first tunnel endpoint through the first SDN switch, and executing a second tunnel endpoint through the second SDN switch, so that the first pod and the second pod are communicated with each other by using the first tunnel endpoint and the second tunnel endpoint.

In one embodiment of the present disclosure, the container network communication method further includes: executing a first pod network interface module through the first node, so that the first pod network interface module obtains a network location of the second node from an API server on a master node, where the second pod is executed in the second node; executing a second pod network interface module through the second node, so that the second pod network interface module obtains a network location of the first node from the API server on the master node, where the first pod is executed in the first node.

In one embodiment of the present disclosure, the container network communication method further includes: when the first node and the second node operate in different networks, the first pod and the second pod use the first tunnel endpoint and the second tunnel endpoint to communicate with each other in a same network through the first and second pod network interface modules.

In one embodiment of the present disclosure, the container network communication method further includes: setting a gateway of the second pod as the second node through the first pod network interface module of the first node; setting a gateway of the first pod as the first node through the second pod network interface module of the second node.

Another embodiment of the present disclosure is related to a container network communication system includes a first node, a first SDN switch, a second node and a second SDN switch. The first node is configured to execute a first pod. The first SDN switch is configured to execute a first tunnel endpoint, and the first SDN switch is connected to the first node. The second node is configured to execute a second pod. The second SDN switch is configured to execute a second tunnel endpoint, and the second SDN switch is connected to the second node. The first node uses the first tunnel endpoint of the first SDN switch to perform an encapsulation based on a tunneling protocol on a first packet with a destination network address indicating the second pod, so as to obtain a first tunnel packet, the first SDN switch sends the first tunnel packet to the second SDN switch, and then the second tunnel endpoint of the second SDN switch performs a decapsulation based on the tunneling protocol on the first tunnel packet, so that the second pod obtains a data of the first packet.

In one embodiment of the present disclosure, the second SDN switch is connected to the first SDN switch through an Internet, the second node uses the second tunnel endpoint of the second SDN switch to perform the encapsulation based on the tunneling protocol on a second packet with a destination network address indicating the first pod, so as to obtain a second tunnel packet, the second SDN switch sends the second tunnel packet to the first SDN switch, and then the first tunnel endpoint of the first SDN switch performs the decapsulation based on the tunneling protocol on the second tunnel packet, so that the first pod obtains a data of the second packet.

In one embodiment of the present disclosure, the container network communication system further includes a master node. The master node is connected to the first SDN switch, the first node executes a first pod network interface module, so that the first pod network interface module obtains a network location of the second node of executing the second pod from an API server on the master node, and the second node executes a second pod network interface module, so that the second pod network interface module obtains a network location of the first node of executing the first pod from the API server on the master node.

In one embodiment of the present disclosure, the container network communication system further includes an SDN controller. The SDN controller is connected to the first SDN switch and the second SDN switch, the first node executes the first pod network interface module to set a gateway of the second pod as the second node, the first node sends an address resolution protocol request to the SDN controller through the first SDN switch, so that the SDN controller replies a media access control address of the second node to the first node through the first SDN switch, the first node uses the media access control address of the second node to send the first packet to the first SDN switch, the first tunnel endpoint encapsulates the first packet into the first tunnel packet and transmits the first tunnel packet to the second SDN switch, the second tunnel endpoint decapsulates the first tunnel packet to the first packet, so that the second pod of the second node obtains the data of the first packet.

In view of the above, the container network communication system and the container network communication method of the present disclosure offload the tunneling protocol to the SDN network switches to reduce the burden on the nodes and to increase the throughput of container network transmission, thereby improving the quality of information services for data centers or network operators.

Many of the attendant features will be more readily appreciated, as the same becomes better understood by reference to the following detailed description considered in connection with the accompanying drawings.

BRIEF DESCRIPTION OF THE DRAWINGS

The invention can be more fully understood by reading the following detailed description of the embodiment, with reference made to the accompanying drawings as follows:

FIG. 2 is a flow chart of a container network communication method according to some embodiments of the present disclosure.

DETAILED DESCRIPTION

Figure 1:
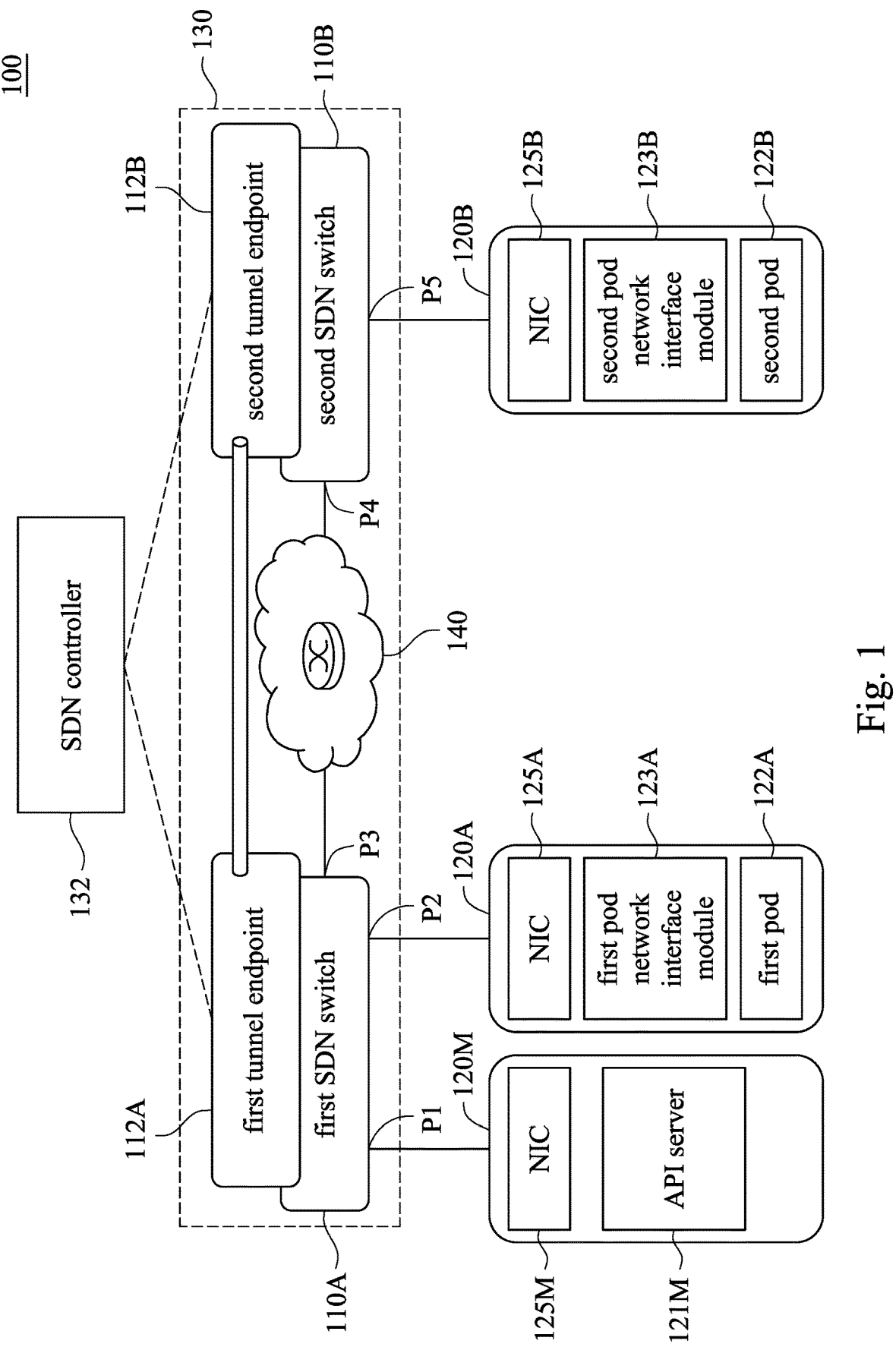
FIG. 1 is a block diagram of a container network communication system according to some embodiments of the present disclosure.

Reference will now be made in detail to the present embodiments of the invention, examples of which are illustrated in the accompanying drawings. Wherever possible, the same reference numbers are used in the drawings and the description to refer to the same or like parts.

Referring to FIG. 1, in one aspect, the present disclosure is directed to a container network communication system

100. This system may be easily applied in Kubernetes cloud service and may be applicable or readily adaptable to all technologies. Accordingly, the container network communication system 100 has advantages. Herewith the container network communication system 100 is described below with FIG. 1.

The subject disclosure provides the container network communication system 100 in accordance with the subject technology. Various aspects of the present technology are described with reference to the drawings. In the following description, for purposes of explanation, numerous specific details are set forth in order to provide a thorough understanding of one or more aspects. It can be evident, however, that the present technology can be practiced without these specific details. In other instances, well-known structures and devices are shown in block diagram form in order to facilitate describing these aspects. The word "exemplary" is used herein to mean "serving as an example, instance, or illustration." Any embodiment described herein as "exemplary" is not necessarily to be construed as preferred or advantageous over other embodiments.

FIG. 1 is a block diagram of the container network communication system 100 according to some embodiments of the present disclosure. As shown in FIG. 1, the container network communication system 100 can includes a master node 120M, a first node 120A, a second node 120B, a first SDN (Software-Defined Networking) switch 110A, a second SDN switch 110B and an SDN controller 132.

In structure, the SDN controller 132 is connected to the first SDN switch 110A and the second SDN switch110B, the second SDN switch 110B is connected to the first SDN switch 110A through Internet 140. The master node 120M is connected to first SDN switch 110A, first SDN switch 110A is connected to first node 120A, and the second SDN switch 110B is connected to the second node 120B. It should be noted that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Specifically, in one embodiment of the present disclosure, the master node 120M includes an API (Application Programming Interface) server 121M, the API server 121M has a NIC (network interface card) 125M, the first node 120A (e.g., a computer device) has a NIC 125A, and the second node 120B (e.g., a computer device) has a NIC125B. The master node 120M is located in the network of the first SDN switch 110A, the first node 120A is located in the network of the first SDN switch 110A, and the second node 120B is located in the network of the second SDN switch 110B. The first pod (container) 122A (e.g., an application program) is executed in the first node 120A, and the second pod 122B (e.g., an application program) is executed in the second node 120B. The master node 120M is connected to the first port P1 of the first SDN switch 110A, the first node 120A is connected to the second port P2 of the first SDN switch 110A, the third port P3 of the first SDN switch110A is connected to Internet140, the fourth port P4 of the second SDN switch 110B is connected to the Internet 140, and the second node 120B is connected to the fifth port P5 of the second SDN switch 110B. The first tunnel endpoint 112A is connected to the second tunnel endpoint 112B for communication, so that the first SDN switch 110A and the second SDN switch 110B form an SDN network 130. The first pod network interface module 123A (e.g., flanneld program, container network interface plugin or the like) and the second pod network interface module 123B (e.g., flanneId program, container network interface plugin or the like) both operate in the host gateway node. The first pod network interface module 123A and the second pod network interface module 123B collect information of nodes of executing the first pod122A and the second pod 122B from the master node 120M. The first pod network interface module 123A knows that second pod122B is in second node120B, and second pod network interface module 123B knows that second pod122B is in second node120B. After a period of time, the first pod 122A sends data to the second pod 122B.

In use, the first node 120A is configured to execute the first pod 122A, and the second node 120B is configured to execute the second pod 122B. The first SDN switch 110A is configured to execute the first tunnel endpoint 112A (e.g., a program that supports the encapsulation and decapsulation based on the tunneling protocol), and the second SDN switch 110B is configured to execute the second tunnel endpoint 112B (e.g., a program that supports the encapsulation and decapsulation based on the tunneling protocol). When the first pod 122A prepares to send data to second pod 122B, the first node 120A uses the first tunnel endpoint 112A of the first SDN switch 110A to perform the encapsulation based on the tunneling protocol on a first packet with a destination network address (e.g., Internet protocol address; IP address) indicating the second pod 122B, so as to obtain a first tunnel packet. The first SDN switch 110A sends the first tunnel packet to the second SDN switch 110B, and then the second tunnel endpoint 112B of the second SDN switch 110B performs the decapsulation based on the tunneling protocol on the first tunnel packet, so that the second pod 122B obtains a data of the first packet.

Similarly, when the second pod 122B prepares to send data to the first pod 122A, the second node 120B uses the second tunnel endpoint 112B of the second SDN switch 110B to perform the encapsulation based on the tunneling protocol on a second packet with a destination network address (e.g., IP address) indicating the first pod 122A, so as to obtain a second tunnel packet. The second SDN switch 110B sends the second tunnel packet to the first SDN switch 110A, and then the first tunnel endpoint 112A of the first SDN switch 110A performs the decapsulation based on the tunneling protocol on the second tunnel packet, so that the first pod 122A obtains a data of the second packet.

In some embodiments of the present disclosure, the first node 120A executes the first pod network interface module 123A (e.g., a software program), so that the first pod network interface module 123A obtains the network location (e.g., IP address) of the second node 120B of executing the second pod 122B from the API server 121M on the master node 120M, and the second node 120B executes the second pod network interface module 123B (e.g., a software program), so that the second pod network interface module 123B obtains a network location (e.g., IP address) of the first node 120A of executing the first pod 122A from the API server 121M on the master node 120M. In this way, the container network interface plugins can periodically ask the API server 121M for the node where the pod is located, and use this information to set appropriate routing rules in the routing tables of all nodes according to the current mode, so that the container communication traffic of the cross-network nodes can be correctly forwarded.

In some embodiments of the present disclosure, the first node 120A sends an address resolution protocol (ARP) request to the SDN controller 132 through the first SDN switch 110A, so that the SDN controller 132 replies a media access control address (MAC address) of the second node 120B to the first node 120A through the first SDN switch 110A, the first node 120A uses the media access control address of the second node 120B to send the first packet to the first SDN switch 110A, the first tunnel endpoint 112A encapsulates the first packet into the first tunnel packet and transmits the first tunnel packet to the second SDN switch 110B, the second tunnel endpoint 112B decapsulates the first tunnel packet to the first packet, so that the second pod 122B of the second node 120B obtains the data of the first packet.

For a more complete understanding of an operation method performed by the container network communication system 100, referring FIG. 1 and FIG. 2, FIG. 2 is a flow chart of the container network communication method 200 according to an embodiment of the present disclosure. As shown in FIG. 2, the container network communication method 200 includes steps S201 and S202. However, as could be appreciated by persons having ordinary skill in the art, for the steps described in the present embodiment, the sequence in which these steps is performed, unless explicitly stated otherwise, can be altered depending on actual needs; in certain cases, all or some of these steps can be performed concurrently.

The container network communication method 200 may take the form of a computer program product on a computer-readable storage medium having computer-readable instructions embodied in the medium. Any suitable storage medium may be used including non-volatile memory such as read only memory (ROM), programmable read only memory (PROM), erasable programmable read only memory (EPROM), and electrically erasable programmable read only memory (EEPROM) devices; volatile memory such as SRAM, DRAM, and DDR-RAM; optical storage devices such as CD-ROMs and DVD-ROMs; and magnetic storage devices such as hard disk drives and floppy disk drives.

When the first pod 122A prepares to send data to second pod 122B, in step S201, the first tunnel endpoint 112A of the first SDN switch 110A performs the encapsulation based on the tunneling protocol on a first packet with a destination network address indicating the second pod 122B, so as to obtain a first tunnel packet.

In step S202, the first SDN switch 110A sends the first tunnel packet to the second SDN switch 110B, and then the second tunnel endpoint 112B of the second SDN switch 110B performs the decapsulation based on the tunneling protocol on the first tunnel packet, so that the second pod 122B obtains a data of the first packet.

Similarly, in the container network communication method 200, when the second pod 122B prepares to send data to the first pod 122A, the second tunnel endpoint 112B of the second SDN switch 110B performs the encapsulation based on the tunneling protocol on a second packet with a destination network address indicating the first pod 122A, so as to obtain a second tunnel packet. The second SDN switch 110B sends the second tunnel packet to the first SDN switch 110A, and then the first tunnel endpoint 112A of the first SDN switch 110A performs the decapsulation based on the tunneling protocol on the second tunnel packet, so that the first pod 122A obtains a data of the second packet.

Regarding the processes of connection of the SDN network 130, when the first and second SDN switches 110A and 110B are located in different networks, it is necessary to connect different networks to form the SDN network130 before the first node 120A communicates with the second node 120B and the first pod 122A communicates with the second pod 122B. Therefore, the first and second SDN switches 110A and 110B of different networks need to establish tunnel ports and are connected to each other in series. These processes can be divided into two steps as follows.

In the first step, the first SDN switch 110A sets the first tunnel endpoint 112A, and the second SDN switch 110B sets the second tunnel endpoint 112B. The tunnel port setting information includes a source MAC address, a source IP address, a destination MAC address, a destination IP address, and an egress port.

In some embodiments of the present disclosure, the source MAC address of first tunnel endpoint 112A is the MAC address of first SDN switch 110A, and the source IP address of first tunnel endpoint 112A is the IP address of first SDN switch110A, the destination MAC address of the first tunnel endpoint 112A is the MAC address of the next node (next hop), the destination IP address of the first tunnel endpoint 112A is the IP address of the second SDN switch 110B, and the egress port of the first tunnel endpoint 112A is the third port P3.

In some embodiments of the present disclosure, the source MAC address of the second tunnel endpoint 112B is the MAC address of the second SDN switch 110B, the source IP address of the second tunnel endpoint 112B is the IP address of the second SDN switch 110B, the destination MAC address of the second tunnel endpoint 112B is the MAC address of the next node, the destination IP address of the second tunnel endpoint 112B is the IP address of the first SDN switch 110A, and the egress port of the second tunnel endpoint 112B is the fourth portP4.

In the second step, the SDN controller 132 installs the Openflow rules based on the nodes in the SDN network switches, each of the first SDN switch 110A and the second SDN switch 110B has three Openflow rules.

The Openflow rule table of the first SDN switch110A: the destination MAC address is the MAC address of NIC 125M, the transmission is to first portP1; the destination MAC address is the MAC address of NIC 125A, the transmission is to second port P2; the destination MAC address is the MAC address of NIC 125B, the transmission is to first tunnel endpoint 112A.

The Openflow rule table of the second SDN switch 110B: the destination MAC address is the MAC address of NIC125M, the transmission is to the second tunnel endpoint 112B; the destination MAC address is the MAC address of NIC 125A, the transmission is to the second tunnel endpoint 112B; the destination MAC address is the MAC address of NIC 125B, the transmission is to the fifth port P5.

After the processes of connection of the SDN network 130, in some embodiments of the present disclosure, the first pod 122A is executed through the first node 120A; the second pod 122B is executed through the second node 120B; the first tunnel endpoint 112A is executed through the first SDN switch 110A, and the second tunnel endpoint 112B is executed through the second SDN switch 110B, so that the first pod 122A and the second pod 122B are communicated with each other by using the first tunnel endpoint 112A and the second tunnel endpoint 112B.

As above, in some embodiments of the present disclosure, when the first node 120A and the second node 120B operate in different networks, the first pod 122A and the second pod 122B use the first tunnel endpoint 112A and the second tunnel endpoint 112B to communicate with each other in the same network (i.e., the SDN network 130) through the first and second pod network interface modules 123A and 123B.

Specifically, regarding the container communication process, when the first pod 122A communicates with the second pod 122B, the processes can be divided into three steps as follows.

In the first step, the first pod network interface module 123A and the second pod network interface module 123B set the routing table for the container communication across the nodes, the first pod network interface module 123A sets the routing table of the first node 120A, and the second pod network interface module 123B sets the routing table of the second node120B. The first pod network interface module 123A sets the destination IP address in the routing table of first node 120A to be the IP address of second pod 122B, the IP address of NIC 125B is set as the gateway, and the sending interface is NIC125A; similarly, the second pod network interface module 123B sets the destination IP address in the routing table of the second node 120B to be the IP address of the first pod 122A, the IP address of NIC125A is set as the gateway, and the sending interface is NIC125B.

In some embodiments of the present disclosure, the gateway of the second pod 122B is set as the second node 120B (e.g., the IP address of the NIC 125B) through the first pod network interface module 123A of the first node 120A; the gateway of the first pod 122A is set as the first node 120A (e.g., the IP address of the NIC 125A) through the second pod network interface module 123B of the second node 120B.

In some embodiments of the present disclosure, the first pod network interface module 123A is executed through the first node 120A, so that the first pod network interface module 123A obtains a network location (e.g., the IP address of the second pod 122B) of the second node 120B from the API server 121M on the master node 120M, where the second pod 122B is executed in the second node 120B; the second pod network interface module 123B is executed through the second node 120B, so that the second pod network interface module 123B obtains a network location (e.g., the IP address of the first pod 122A) of the first node 120A from the API server 121M on the master node 120M, where the first pod 122A is executed in the first node 120A.

In the second step, each of the first node 120A and the second node120B send an ARP request based on the address resolution protocol (ARP) to request the MAC address of the corresponding gateway, and the SDN controller132 informs the MAC address of the gateway through the ARP reply. In some embodiments of the present disclosure, the first node 120A sends an address resolution protocol (ARP) request to the SDN controller 132 through the first SDN switch 110A, so as to ask the SDN controller 132 for the MAC address of the NIC 125B of the gateway, and the SDN controller 132 replies the ARP reply to first node120A through the first SDN switch 110A, so as to inform the first node120A of the MAC of the NIC125B; similarly, the second node 120B sends an ARP request to the SDN controller132 through the second SDN switch110B, so as to ask the SDN controller132 for the MAC address of the NIC 125A of the gateway, and the SDN controller 132 replies an ARP reply to the second node 120B through the second SDN switch 110B, so as to inform the second node 120B of the MAC address of the NIC 125A.

In the third step, when the first pod 122A prepares to send data to second pod 122B, the first node120A obtains the MAC address of the NIC 125B through the ARP request and sends the first packet (e.g., a data packet) of the first pod 122A to the first SDN switch110A. The first SDN switch 110A sends the first packet to the first tunnel endpoint 112A according to the destination MAC address of the NIC 125B. The first tunnel endpoint 112A encapsulates the first packet of the first pod 122A in the tunneling protocol to obtain the first tunnel packet, and transmits the first tunnel packet to the second SDN switch110B. After receiving the first tunnel packet, the second SDN switch110B sends the first tunnel packet to the second tunnel endpoint 112B, and the second tunnel endpoint 112B performs the decapsulation based on the tunneling protocol to obtain the first packet. After the decapsulation, according to the destination MAC address is NIC125B, the first packet is sent to the second node120B through the fifth port P5. In this way, the first pod122A can transmit data to the second pod122B.

In view of the above, the container network communication system 100 and container network communication method 200 of the present disclosure offload the tunneling protocol to the SDN network switches to reduce the burden on the nodes and to increase the throughput of container network transmission, thereby improving the quality of information services for data centers or network operators.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A container network communication method, comprising steps of:

before sending an address resolution protocol request, setting a first tunnel endpoint in a first SDN switch and a second tunnel endpoint in a second SDN switch, wherein a tunnel port setting information of each of the first tunnel endpoint and the second tunnel endpoint includes a tunnel source MAC address, a tunnel source IP address, a tunnel destination MAC address a tunnel destination IP address, and an egress port, wherein the first SDN switch and the second SDN switch are located in different networks;

before sending the address resolution protocol request, installing a rule in the first SDN switch and the second SDN switch, wherein the rule comprises a transmission port that corresponds to a destination MAC address;

sending the address resolution protocol request directly to a SDN controller by the first SDN switch;

replying to the first SDN switch with a media access control address of a gateway by the SDN controller;

deciding the transmission port according to the media access control address of the gateway and the destination MAC address, wherein the transmission port indicates to the egress port of the first tunnel endpoint;

performing an encapsulation based on a tunneling protocol on a first packet with a destination network address indicating a second pod by the first tunnel endpoint of the first SDN switch, so as to obtain a first tunnel packet; and sending the first tunnel packet according to the media access control address of the gateway from the first SDN switch to the second SDN switch, and then performing a decapsulation based on the tunneling protocol on the first tunnel packet by the second tunnel endpoint of the second SDN switch, and the second pod obtains a data of the first packet.

2. The container network communication method of claim 1, further comprising:

performing the encapsulation based on the tunneling protocol on a second packet with a destination network address indicating a first pod by the second tunnel endpoint of the second SDN switch, so as to obtain a second tunnel packet; and sending the second tunnel packet from the second SDN switch to the first SDN switch, and then performing the decapsulation based on the tunneling protocol on the second tunnel packet by the first tunnel endpoint of the first SDN switch, and the first pod obtains a data of the second packet.

3. The container network communication method of claim 2, further comprising:

executing the first pod through a first node, and the first node connected to the first SDN switch;

executing the second pod through a second node, the second node connected to the second SDN switch, and the second SDN switch connected to the first SDN switch through an Internet; and executing the first tunnel endpoint through the first SDN switch, and executing the second tunnel endpoint through the second SDN switch, and the first pod and the second pod are communicated with each other by using the first tunnel endpoint and the second tunnel endpoint.

4. The container network communication method of claim 3, further comprising:

executing a first pod network interface module through the first node, and the first pod network interface module obtains a network location of the second node from an API (Application Programming Interface) server on a master node, wherein the second pod is executed in the second node; and executing a second pod network interface module through the second node, and the second pod network interface module obtains a network location of the first node from the API server on the master node, wherein the first pod is executed in the first node.

5. The container network communication method of claim 4, wherein the first pod and the second pod use the first tunnel endpoint and the second tunnel endpoint to communicate with each other in a same network through the first and second pod network interface modules.

6. The container network communication method of claim 4, further comprising:

setting a gateway of the second pod as the second node through the first pod network interface module of the first node; and setting a gateway of the first pod as the first node through the second pod network interface module of the second node.

7. The container network communication method of claim 3, further comprising:

executing a first pod network interface module through the first node, and the first pod network interface module obtains a network location of the second node from an API server on a master node, wherein the second pod is executed in the second node.

8. The container network communication method of claim 7, further comprising:

setting a gateway of the second pod as the second node through the first pod network interface module of the first node.

9. The container network communication method of claim 3, further comprising:

executing a second pod network interface module through the second node, and the second pod network interface module obtains a network location of the first node from an API server on a master node, wherein the first pod is executed in the first node.

10. The container network communication method of claim 9, further comprising:

setting a gateway of the first pod as the first node through the second pod network interface module of the second node.

11. A container network communication system, comprising:

a first node configured to execute a first pod;

a first SDN switch configured to execute a first tunnel endpoint, and the first SDN switch connected to the first node, wherein before the first node sends an address resolution protocol request, the first tunnel endpoint in the first SDN switch is set, and a tunnel port setting information of the first tunnel endpoint includes a tunnel source MAC address, a tunnel source IP address, a tunnel destination MAC address, a tunnel destination IP address, and an egress port;

a second node configured to execute a second pod;

a second SDN switch configured to execute a second tunnel endpoint, and the second SDN switch connected to the second node, wherein before the first node sends the address resolution protocol request, the second tunnel endpoint in the second SDN switch is set, and a tunnel port setting information of the second tunnel endpoint includes a tunnel source MAC address, a tunnel source IP address, a tunnel destination MAC address, a tunnel destination IP address, and an egress port, wherein the first SDN switch and the second SDN switch are located in different networks; and a SDN controller connected to the first SDN switch and the second SDN switch, wherein before the first node sends the address resolution protocol request, the SDN controller installs a rule in the first SDN switch and the second SDN switch, wherein the rule comprises a transmission port that corresponds to a destination MAC address, wherein the first node sends the address resolution protocol request to the SDN controller through the first SDN switch, and the SDN controller replies to the first node with a media access control address of a gateway through the first SDN switch, wherein the first SDN switch decides the transmission port according to the media access control address of the gateway and the destination MAC address, wherein the transmission port indicates to the egress port of the first tunnel endpoint, wherein the first node uses the first tunnel endpoint of the first SDN switch to perform an encapsulation based on a tunneling protocol on a first packet with a destination network address indicating the second pod, so as to obtain a first tunnel packet, wherein the first SDN switch sends the first tunnel packet according to the media access control address of the gateway to the second SDN switch, and then the second tunnel endpoint of the second SDN switch performs a decapsulation based on the tunneling protocol on the first tunnel packet, and the second pod obtains a data of the first packet.

12. The container network communication system of claim 11, wherein the second SDN switch is connected to the first SDN switch through an Internet, the second node uses the second tunnel endpoint of the second SDN switch to perform the encapsulation based on the tunneling protocol on a second packet with a destination network address indicating the first pod, so as to obtain a second tunnel packet, the second SDN switch sends the second tunnel packet to the first SDN switch, and then the first tunnel endpoint of the first SDN switch performs the decapsulation based on the tunneling protocol on the second tunnel packet, and the first pod obtains a data of the second packet.

13. The container network communication system of claim 12, further comprising:

a master node connected to the first SDN switch, the first node executes a first pod network interface module, and the first pod network interface module obtains a network location of the second node of executing the second pod from an API server on the master node, and the second node executes a second pod network interface module, and the second pod network interface module obtains a network location of the first node of executing the first pod from the API server on the master node.

14. The container network communication system of claim 13, wherein the first node executes the first pod network interface module to set a gateway of the second pod as the second node, the first node sends the address resolution protocol request to the SDN controller through the first SDN switch, and the SDN controller replies to the first node with the media access control address of the second node through the first SDN switch, the first node uses the media access control address of the second node to send the first packet to the first SDN switch, the first tunnel endpoint encapsulates the first packet into the first tunnel packet and transmits the first tunnel packet to the second SDN switch, the second tunnel endpoint decapsulates the first tunnel packet to the first packet, and the second pod of the second node obtains the data of the first packet.

15. The container network communication system of claim 13, wherein the first node executes the first pod network interface module to set a gateway of the second pod as the second node, the first node sends the address resolution protocol request to the SDN controller through the first SDN switch, and the SDN controller replies to the first node with a media access control address of the second node through the first SDN switch.

16. The container network communication system of claim 15, wherein the first node uses the media access control address of the second node to send the first packet to the first SDN switch.

17. The container network communication system of claim 16, wherein the first tunnel endpoint encapsulates the first packet into the first tunnel packet and transmits the first tunnel packet to the second SDN switch, the second tunnel endpoint decapsulates the first tunnel packet to the first packet, and the second pod of the second node obtains the data of the first packet.

* * * * *